Nov. 15, 1955    E. M. GREENBERG    2,723,660
ARTIFICIAL UTERUS
Filed July 22, 1954    2 Sheets-Sheet 2

EMANUEL M. GREENBERG
INVENTOR

BY Ralph H. E. Bitner

ATTORNEY

United States Patent Office 2,723,660
Patented Nov. 15, 1955

2,723,660

ARTIFICIAL UTERUS

Emanuel M. Greenberg, New York, N. Y.

Application July 22, 1954, Serial No. 444,958

6 Claims. (Cl. 128—1)

This application is a continuation-in-part of application Serial No. 269,052, filed January 30, 1952, and now abandoned.

This invention relates to an artificial uterus which is used to support a prematurely born fetus and to provide nourishment and elimination of waste products in a manner similar to that employed by the mother's uterus.

A large number of prematurely passed fetuses are lost because of their inability to survive after the umbilical cord has been cut. Only a small percentage of babies live if their weight at birth is less than two pounds.

The development of an artificial heart and lung has made possible the continued oxygenation of blood and the development of an artificial kidney can now be applied to filter waste products from a blood stream. Also due to a recent development liquid food containing fats, proteins, as well as glucose may be added to the blood stream. The present invention uses these components as part of the system which allows a fetus to live and grow outside the human body until it attains a stage of development which permits its removal from the artificial uterus.

One of the objects of this invention is to provide an artificial uterus which will sustain an unborn fetus in a condition similar to that of the human uterus.

Another object of the invention is to provide a continuous supply of nutrient and oxygenated blood to and from the fetus and to provide for the elimination of waste products.

Another object of the invention is to support the fetus and the placenta in a structure which may be maintained at a uniform temperature.

Another object of the invention is to provide a structure whereby the placenta is subjected to a continuous supply of purified blood.

The invention comprises a removable structure which includes a container for the fetus and a separate compartment for the placenta where a constant stream of pure blood is available. The blood for the placenta is circulated by means of two pumps through an artificial kidney, an oxygenating apparatus, a container where liquid food is added, and a filter which removes blood clots and other solid matter. A circulating water supply is provided which heats water to body temperature and by means of water jackets maintains the fetus chamber and the oxygenating apparatus at body temperature.

For a better understanding of the present invention, together with other and further objects thereof, reference is made to the following description taken in connection with the accompanying drawings.

Figure 1:
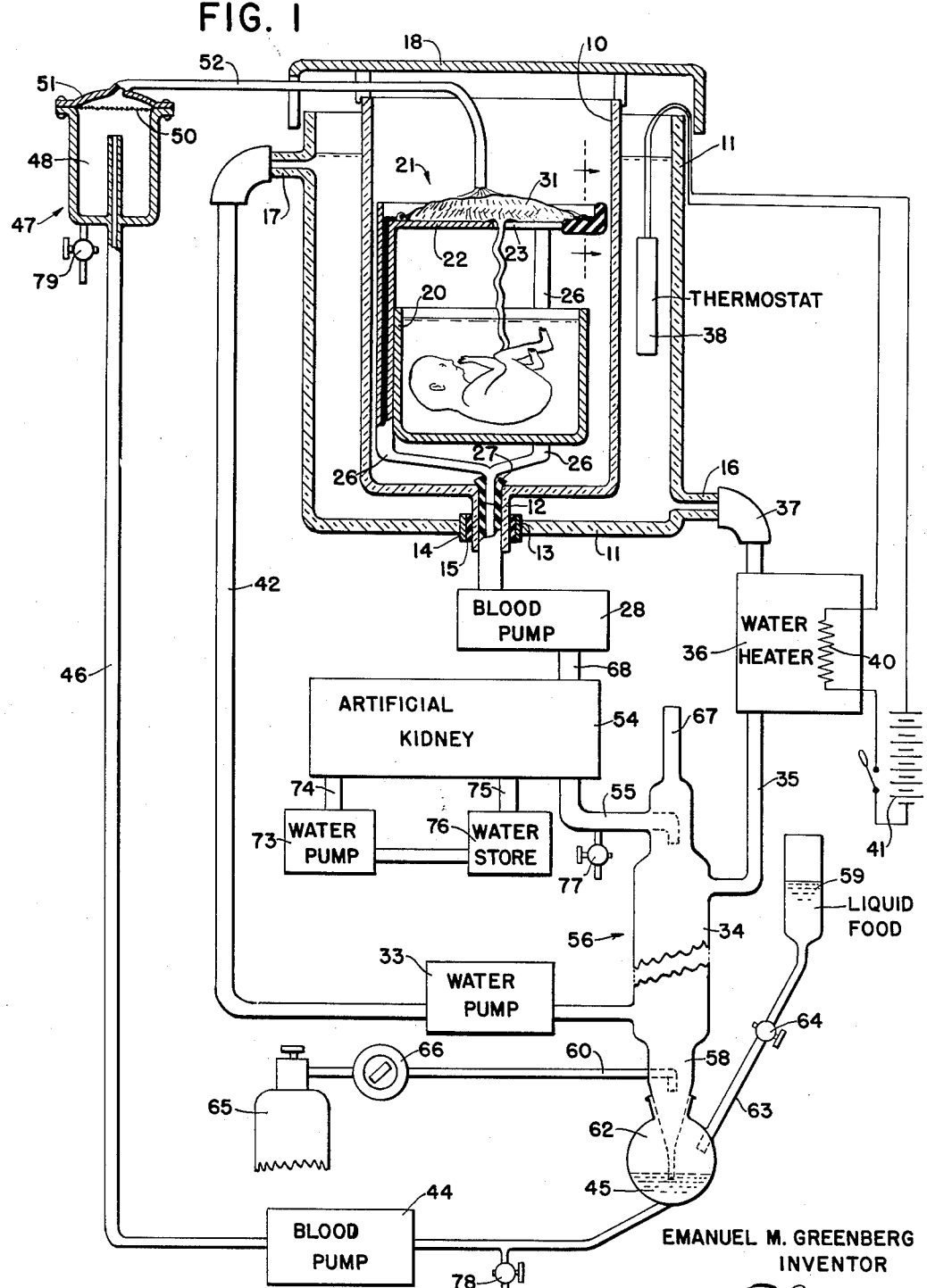
Fig. 1 is a schematic diagram showing the entire system with the fetus chamber shown in section.

Referring now to Fig. 1 a glass container 10 is supported within a water jacket 11 and includes an exit pipe 12. The water jacket 11 also includes an exit hole 13 which is fitted with a composite plug of ceramic 14 and soft rubber 15. The exit pipe 12 is fitted into the rubber portion 15 to form a leak proof joint. The water jacket also includes an inlet pipe 16 near the bottom of the jacket and an exit pipe 17 near the top edge. A cover 18 is loosely fitted over both containers to keep out dust and dirt.

Figure 3:
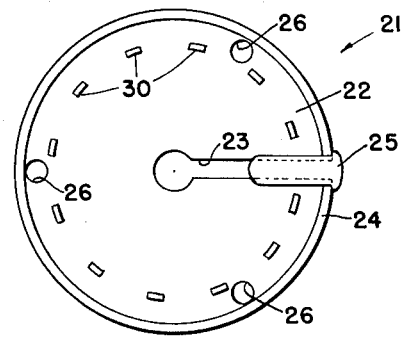
Fig. 3 is a top view of the placental compartment before the placenta has been installed.
Figure 4:
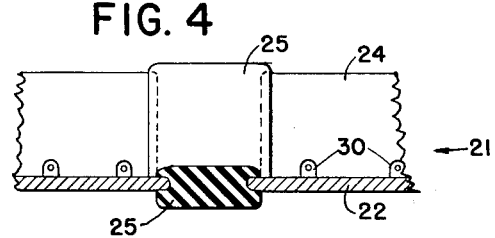
Fig. 4 is a sectional drawing taken along lines 4—4 of Fig. 1 and shows the details of a sponge rubber insert which is added to the placental compartment.
Figure 5:
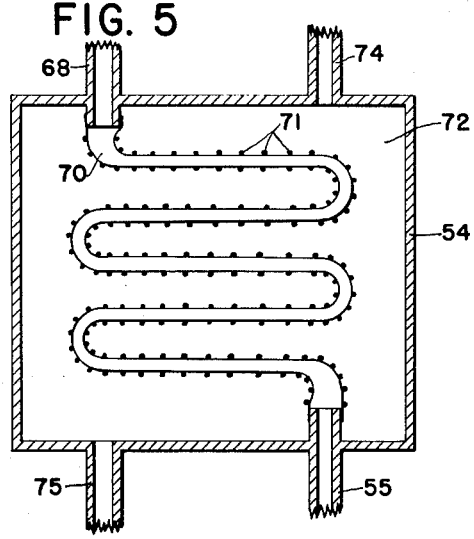
Fig. 5 is a cross sectional view of the artificial kidney.

A removable structure for supporting the fetus and placenta is placed within chamber 10 and includes a container 20 for the fetus and a compartment 21 where the placenta is secured. Details of the compartment 21 are shown in Figs. 3 and 4 and include a flat disk 22 which is provided with a slot 23 which extends from the periphery 24 to the center of the disk. Slot 23 is provided in order to place the umbilical cord at the center of the disk when the placenta is placed in position and a rubber insert 25 is provided for plugging up part of the slot and part of the periphery to keep the blood within the placental compartment.

The placental compartment is mounted directly above the container for the fetus and is secured to it by three or more hollow tubes 26. These hollow tubes are welded to the bottom of plate 22 with openings through the plate so that blood may freely circulate from the placental container into the hollow portion of the tube. Tubes 26 are also welded to container 20 acting as a support and are combined into one tube which is inserted into a rubber tube 27 which is fitted into exit pipe 12 and forms the entrance tube connected to a blood pump 28.

The flat plate 22 may be made of stainless steel and contains a plurality of small eyelets 30 which are secured to the plate by welding. The eyelets are employed for securing a placenta 31 to the plate 22 by a plurality of sutures threaded through the holes in the eyelets and sewed to the upper portion of the placenta.

Figure 2:
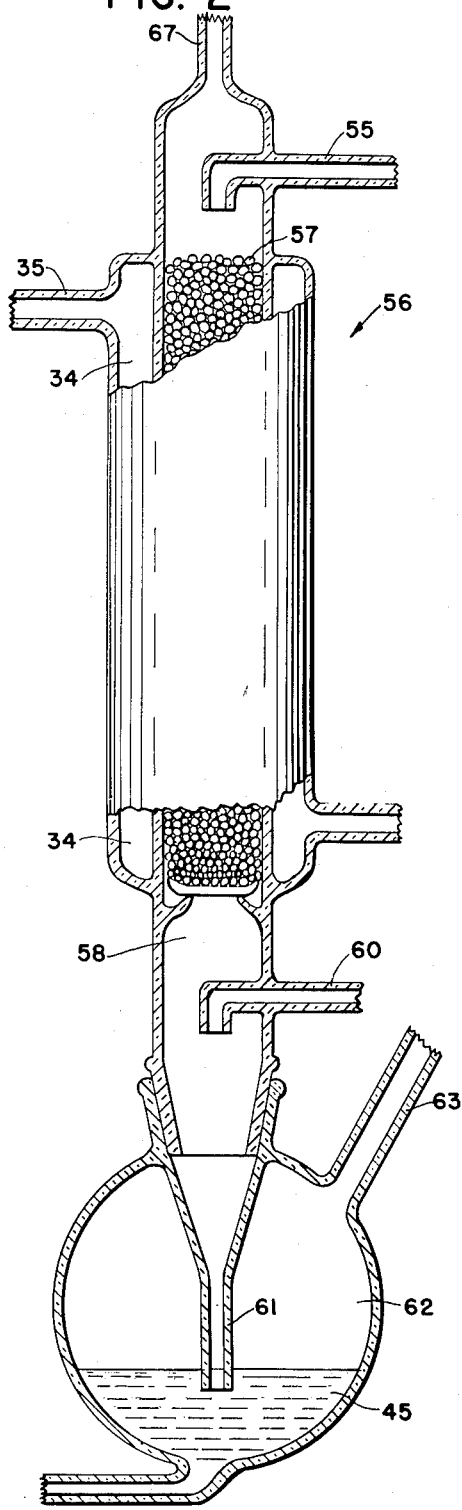
Fig. 2 is a cross sectional drawing of the oxygenating apparatus showing the chamber in which the liquid food may be added.

The circulating water for maintaining a constant body temperature is circulated by means of a water pump 33 which pumps the water through a water jacket 34 (Fig. 2), then through a pipe 35, water heater 36, and pipe 37 to container 11. Constant temperature is maintained by means of a thermostat 38 which controls the current through an electrical heater 40 supplied by a source of potential 41. On leaving the water jacket 11 the water passes through pipe 42 back to the water pump 33.

The circulation of blood is maintained by a first blood pump 44 which pumps blood from a small reservoir 45 through the pump and into pipe 46 which empties into a container 47, employed for the removal of clots and other solid material. Container 47 includes a storage space 48 where the clots and solid particles may settle during the operation. The blood pumped into this container passes upwardly through a fine mesh screen 50 of stainless steel supported in the container at the junction of the lower container 48 and a lid 51 which is bolted securely to container 48 to form a leak-proof seal. The top of lid 51 is connected to a flexible pipe 52 which discharges blood over the placenta 31 so that food and nourishment may be transferred to the fetus while at the same time waste products are removed from the circulating system of the fetus.

After passing over the upper surface of the placenta the blood passes through pipe 26 and into a second blood pump 28 which is necessary at this portion of the blood circulating system because the artificial kidney will not conduct blood through its small spaces due to gravity alone. After the blood has passed through artificial kidney 54, where nitrogenous compounds are removed by dialysis, the blood passes through pipe 55 into the oxygenating apparatus 56. The blood passes over a large quantity of small beads 57 which may be of glass but preferably constructed of materials which are not wetted by the blood, such as "Teflon," or other plastic materials devoid of hydroxyl molecular construction. After passing over beads 57 the blood enters a lower chamber 58 where the oxygen is added through pipe 60, then the blood flows down through tube 61 into a blood storage compartment 62. The liquid food is stored in a vertical tube 59 and enters the storage compartment 62 by means of pipe 63 in which is installed a stopcock 64 which can be adjusted to restrict the flow of liquid food to a predetermined amount. While the blood trickles down over beads 57 the oxygen from a storage tank 65, controlled by a diaphragm valve 66, passes upwardly through the interstices between the beads and passes out an opening 67 at the top of column 56. During this process the blood absorbs some of the oxygen but the main reaction includes an oxidation of some of the impurities in the blood resulting in the formation of carbon dioxide gas which passes out through opening 67 along with some of the excess oxygen.

Since there is a tendency for the blood corpuscles to separate and form clots when in contact with the oxygen a small quantity of sodium oxalate or other suitable chemical is added to the blood. This chemical removes the calcium salts in the blood and prevents clotting. It has been found that small clots are not harmful because the circulating blood makes contact with the fetus blood only through the placental membrane.

The artificial kidney receives the impure blood from pump 28 through pipe 68 and delivers the blood to pipe 55 at the top of column 56. The artificial kidney 54 is similar to the apparatus described in the Proceedings of the Society for Experimental Biology and Medicine, 1951, volume 76, pages 471 to 475 by Stephan S. Rosenak and Abraham Saltzman. Impurities are removed from the blood by dialysis through a film of cellophane. A length of cellophane tubing 70 is secured at one end to pipe 68 and at the other end to pipe 55 thereby providing no air or dead space to impede the flow of blood through the apparatus. The cellophane tubing is supported by a plurality of stainless steel wires 71 which are secured to a base plate 72 and hold the cellophane tubing in position while permitting a large contact surface for the wash water and also permitting considerable flexibility made necessary by the variation in blood pressure caused by the pumping action.

The wash water comes from a pump 73 and enters the artificial kidney by means of pipe 74. During its passage through the kidney container 54 the wash water completely surrounds and washes the outer surface of the cellophane tubing. The water leaves the container 54 by means of pipe 75 and enters a storage container 76 which is connected to the pump 73 for recirculation. The standard composition for wash water is as follows, expressed in gram percentages. Dextrose 1; NaCl, .610; $NaHCO_3$, .220; KCl, .0360; $CaCl_2$, $6H_2O$, .0450; $MgCl_2$, $6H_2O$, .0107; $NaH_2PO_4H_2O$, .0058.

During the passage of the wash water through the artificial kidney nitrogenous waste material is absorbed through the cellophane wall by dialysis and is removed to the storage container 76. At certain intervals a change of wash water will be necessary and this can conveniently be done while the water is in the storage container.

The above described apparatus is constructed so as to permit frequent inspection of all the processes being performed. Samples of blood may be removed from the system after passing the artificial kidney by means of stopcock 77 and in a similar manner samples may be removed by means of stopcock 78 after passage through the oxygenating column 56. A similar valve 79 is provided at the bottom of storage tank 48 for draining the tank to collect clotted material.

When the fetus has grown to a sufficient size and weight so that the umbilical cord may be cut, the pumps are stopped, the free end of tube 52 is pushed to one side and the structure within container 10 is lifted from the container and the fluid in container 20 is removed. The umbilical cord is then cut and the placenta 31 is destroyed.

It is well known that small fetuses require only a small amount of blood because of their size and because there is a minimum expenditure of muscular energy. For this reason it is contemplated to use a number of constant temperature units each having a fetal chamber and a placental container in combination with one set of purifying mechanisms. This set includes an artificial kidney 54, an oxygenating column 56, and a trap 47 for blood clots and dirt. To insure the safe and continued operation of such a system a standby set should be held ready for instant substitution at all times.

As the artificial kidney and heart-lung mechanisms attain greater simplicity and perfection through evolutionary improvements, these more advanced units will be used in the component structure of the artificial uterus.

There may be occasions when the placenta is torn or otherwise damaged, or it may be unfit to function as a normal blood supply for the fetus. In such instances the umbilical cord will be cut when the fetus is removed from the mother and catheters are inserted into the umbilical cord section. One catheter receives pure blood from pipe 52 and the other catheter is connected to the blood pump 28 which pumps impure blood into the artificial kidney. For such an operation the flow of blood must be necessarily restricted.

While there have been described and illustrated specific embodiments of the invention it will be obvious that various changes and modifications may be made therein without departing from the invention which should be limited only by the claims.

I claim:

1. An artificial uterus comprising, a first container for a fetus, a second container for a placenta which is supported in adjacent relationship thereto; an oxygenating means for purifying blood, a dialyzer for extracting nitrogenous waste products from blood, and pump circulating means which circulates a quantity of blood over a portion of the placenta, through the dialyzer, through the oxygenating means, and back to the placenta.

2. An artificial uterus comprising, a first container for a fetus, a second container for a placenta which is supported in adjacent relationship thereto, an oxygenating means for purifying blood, a dialyzer for extracting nitrogenous waste products from the blood; pump circulating means which circulates a quantity of blood over a portion of the placenta, through the dialyzer, through the oxygenating means and back to the placenta; and enclosing means for the containers and the oxygenating means which maintains them at a constant temperature.

3. An artificial uterus comprising, a first container for a fetus, a second container for a placenta which is supported in adjacent relationship thereto, an oxygenating means for purifying blood, a dialyzer for extracting nitrogenous waste products from the blood; a pump circulating means which circulates a quantity of blood over a portion of the placenta, through the dialyzer, through the oxygenating means, and back to the placenta; and pump circulating means which circulates wash water through a portion of the dialyzer for removing waste products.

4. An artificial uterus comprising, a first container for a fetus, a second container for a placenta which is supported in adjacent relationship thereto, an oxygenating means for purifying blood, a dialyzer for extracting nitrogenous waste products from blood; pump circulating means which circulates a quantity of blood over a portion of the placenta, through the dialyzer, through the oxygenating means, and back to the placenta; and a container connected to said pump circulating means for supplying liquid food to the blood.

5. An artificial uterus comprising, a first container for a fetus, a second container for a placenta which is supported in adjacent relationship thereto, said second container formed with a slot for positioning an umbilical cord connecting the fetus and the placenta, an oxygenating means for purifying blood, a dialyzer for extracting nitrogenous waste products from blood; and pump circulating means which circulates a quantity of blood over a portion of the placenta, through the dialyzer, through the oxygenating means, and back to the placenta.

6. An artificial uterus comprising: a first container for a fetus; a second container secured to the first for supporting a placenta; said second container formed with a slot for positioning an umbilical cord connecting the fetus and the placenta; an oxygenating means for purifying blood; a dialyzer for extracting nitrogenous waste products from blood; pump circulating means which circulates a quantity of blood over a portion of the placenta, through the dialyzer, through the oxygenating means, and back to the placenta; pump circulating means which circulates wash water through a portion of the dialyzer for removing waste products; and enclosing means for said first and second containers and the oxygenating means which maintains them at a constant predetermined temperature.

No references cited.